United States Patent [19]

Mattson

[11] Patent Number: 5,033,564
[45] Date of Patent: Jul. 23, 1991

[54] POWER RIDING TRAILER FOR AN IMPLEMENT

[75] Inventor: Bryan Mattson, Hastings, Mich.

[73] Assignee: Floor Style Products, Inc., Hastings, Mich.

[21] Appl. No.: 481,294

[22] Filed: Feb. 20, 1990

[51] Int. Cl.⁵ .............................................. B62D 63/00
[52] U.S. Cl. .................................. 180/11; 152/323; 172/115; 172/257; 180/14.1; 180/305; 180/307; 191/11; 297/345; 301/105 R; 301/111; 403/1
[58] Field of Search ............ 180/11, 14.1, 14.3, 180/6.48, 6.5, 19.2, 19.3, 305, 306, 307; 299/39; 152/323; 403/1; 297/345; 301/111, 112, 105; 191/11; 172/115, 114, 256, 257

[56] References Cited

U.S. PATENT DOCUMENTS

| | | | |
|---|---|---|---|
| 3,024,858 | 3/1962 | Davis et al. | 180/6.48 |
| 3,037,755 | 6/1962 | Hatcher | 299/39 |
| 3,087,712 | 4/1963 | Hatcher | 299/39 |
| 3,090,647 | 5/1963 | Moore | 297/345 |
| 3,161,994 | 12/1964 | Neitzer, Jr. | 299/39 |
| 3,208,796 | 9/1965 | Hatcher | 299/39 |
| 3,417,638 | 12/1968 | Haase et al. | 299/39 |
| 3,424,260 | 1/1969 | Stone et al. | 180/305 |
| 3,450,224 | 6/1969 | Griesenbrock | 180/307 |
| 3,653,687 | 4/1972 | Forsyth et al. | 180/14.1 |
| 3,705,638 | 12/1972 | Shock | 180/14.3 |
| 3,891,042 | 6/1975 | Braun | 180/6.48 |
| 4,017,136 | 4/1977 | Sasgen | 191/11 |
| 4,095,637 | 6/1978 | Krishnan | 152/323 |
| 4,413,698 | 11/1983 | Conrad et al. | 180/305 |
| 4,530,416 | 7/1985 | Kassai | 180/307 |
| 4,570,741 | 2/1986 | McCoy | 180/242 |
| 4,610,558 | 9/1986 | Erickson | 403/1 |
| 4,629,391 | 12/1986 | Soyk et al. | 180/19.1 |
| 4,651,846 | 3/1987 | Headrick | 180/243 |
| 4,793,434 | 12/1988 | Bachle | 180/243 |

Primary Examiner—Mitchell J. Hill
Attorney, Agent, or Firm—Frank J. Uxa, Jr.

[57] ABSTRACT

A vehicle having a length, a front end and a substantially opposing rear end useful for propelling an implement pivotably coupled thereto at or near the front end. The vehicle comprises two driven wheels located at or near the rear end and positioned to rotate in a direction generally parallel to the length of the vehicle; a power system acting to provide power to rotate the two driven wheels; at least one non-steered wheel located at or near the front end, the non-steered wheel being rotatable about an axis which axis is at least partially rotatable; and a seat acting to provide a location at which a human being can sit on the vehicle and control the vehicle. The vehicle is sized so that the human being sitting in the seat is capable of directly steering the pivotably coupled implement.

20 Claims, 3 Drawing Sheets

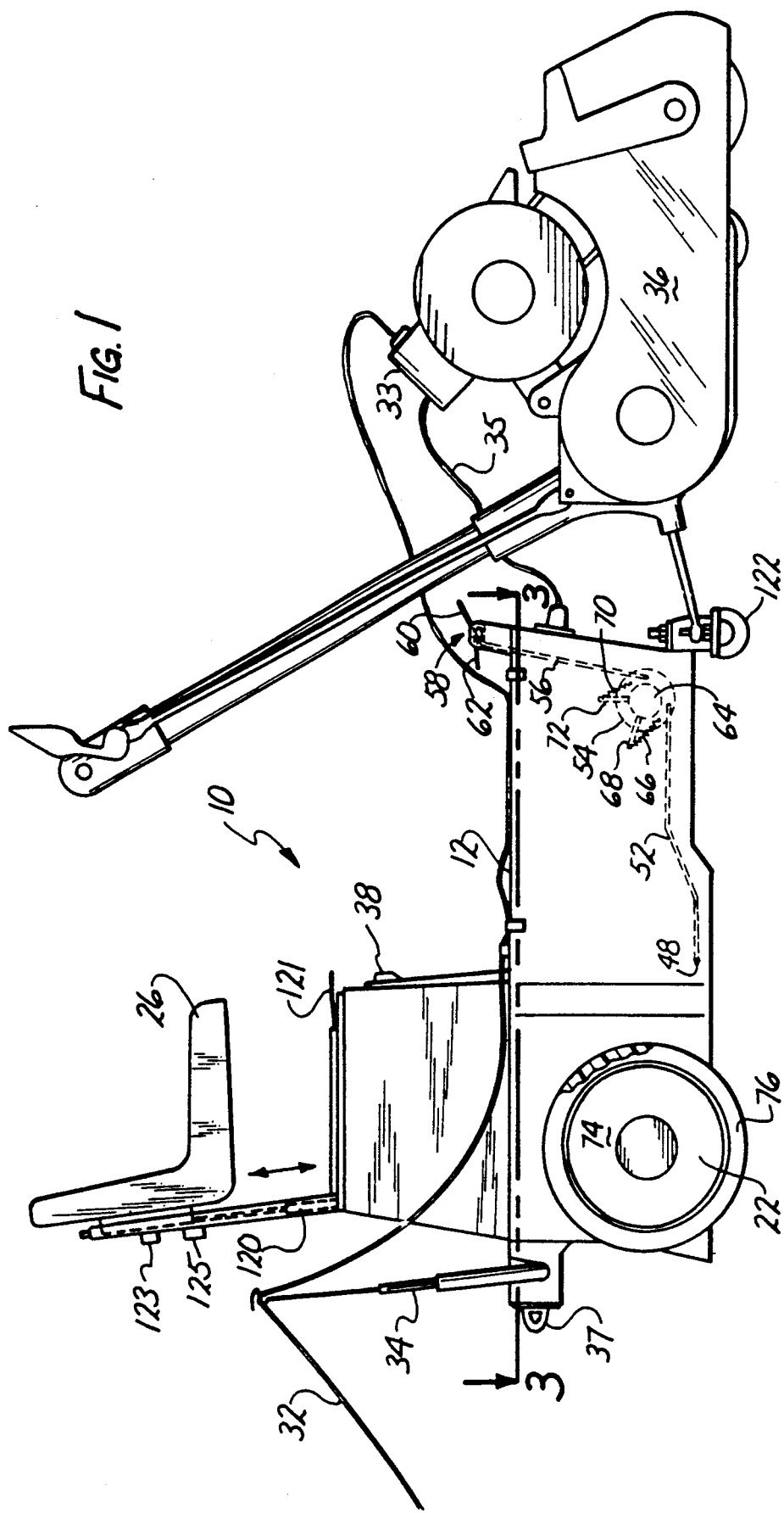

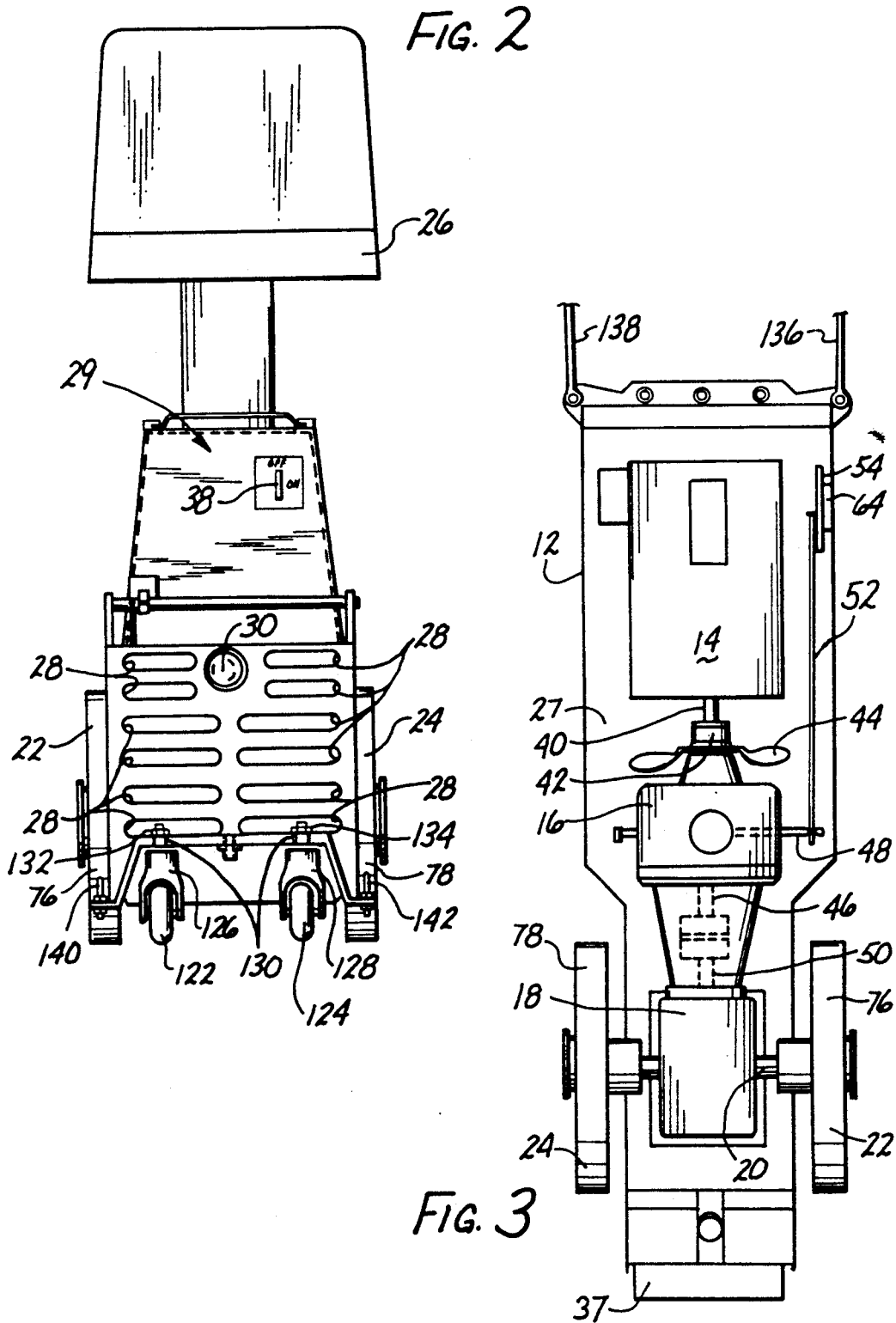

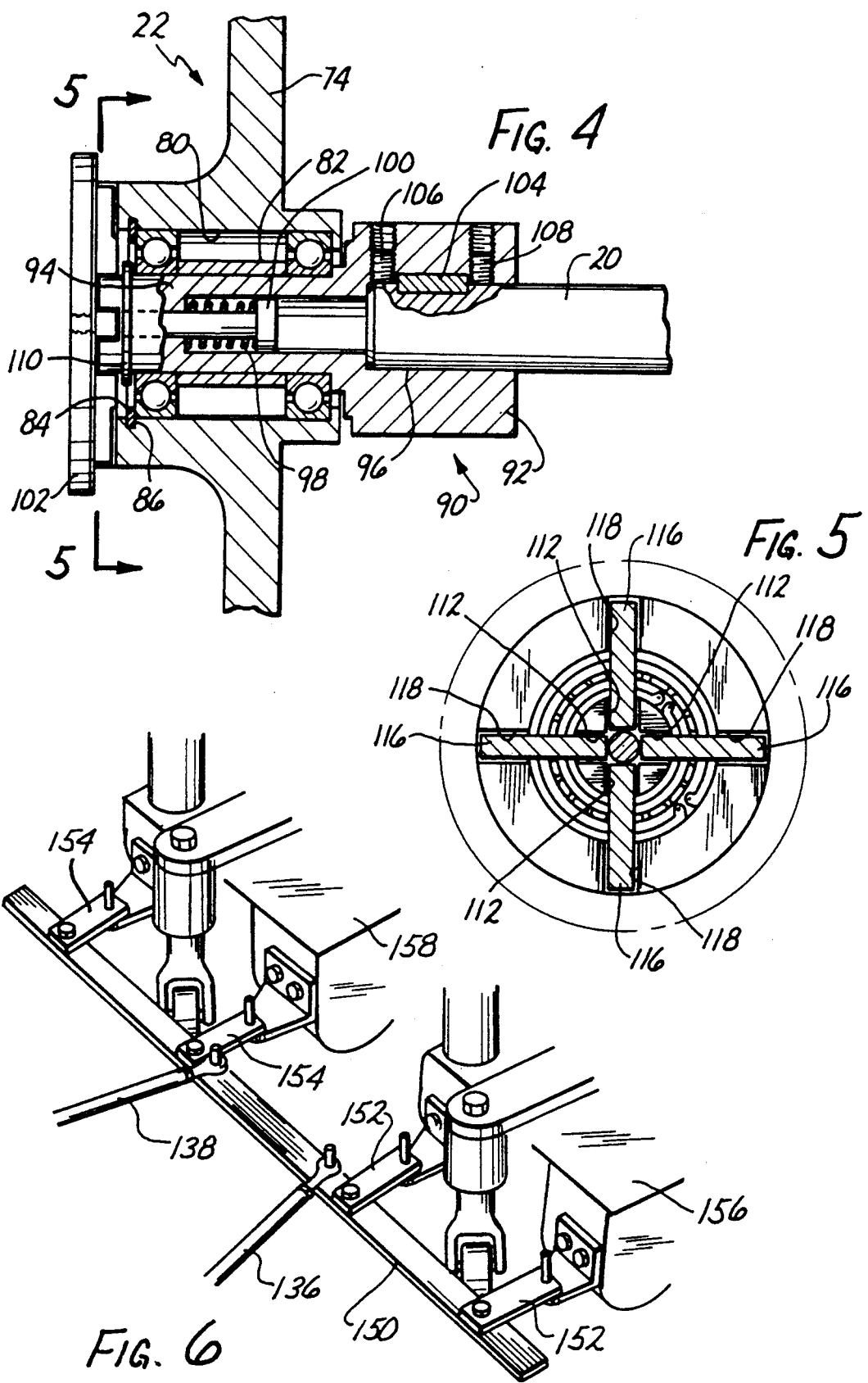

POWER RIDING TRAILER FOR AN IMPLEMENT

BACKGROUND OF THE INVENTION

The present invention relates to a power riding trailer for use in controlling, e.g., controlling the speed and/or direction of, an implement. More particularly, the invention relates to such a trailer for use with an implement, such as a floor sander or the like, which is effective, simple and straight forward in construction, easy to operate, subject to reduced wear and has reduced maintenance requirements.

It is often necessary to sand or refinish large areas of flooring, such as basketball gyms, ballrooms or the like. In order to make this job easier and less time consuming, the use of riding trailers has been employed. Thus, the sander, e.g., a drum sander, or other implement is hitched or otherwise coupled to a trailer. A human being, sitting atop this trailer, controls both the trailer and the implement and, overall, gets the job done faster than if he/she had to walk behind the implement.

One such riding trailer or attachment is disclosed in Neitzer, Jr. U.S. Pat. No. 3,161,994. The Neitzer, Jr. riding attachment includes two propelling and supporting wheels mounted on an axle driven by an electrical motor through a drive assembly including belts, pulleys, a chain and a sprocket. In addition, this attachment has a separate steering lever which is coupled to a caster on the sander. Thus, the operator of the attachment indirectly steers the sander by manipulating the steering lever on the attachment to steer the caster. This riding attachment has several drawbacks. For example, the relatively complex drive assembly between the electric motor and the axle may be prone to frequent breakdowns and may require substantial maintenance. In addition, the feature in which the sander is indirectly steered using a steering lever on the attachment reduces the amount of control of and "feel" for the sander the operator has.

A riding trailer of simpler construction which provides for direct steering control of the sander or other implement would clearly be advantageous.

SUMMARY OF THE INVENTION

A new vehicle useful in controlling an implement removably coupled thereto has been discovered. This vehicle provides substantial advantages. For example, the vehicle requires no independent steering system. Thus, a human operator, seated on the vehicle, can directly control the operation of the coupled implement as though he/she was walking behind and pushing the implement. When moving forward, the vehicle moves in the direction in which the operator points the coupled implement. In addition, the present vehicle preferably has a simple drive assembly which is very reliable in operation, is subject to reduced wear and has reduced maintenance requirements, e.g., relative to prior art systems which include belts, pulleys, chains and sprockets. The present vehicle is very effective and efficient in propelling implements, such as drum sanders, and may be specifically adapted for use on wood or other relatively sensitive surfaces which are not to be damaged or disfigured by the vehicle itself.

In one broad aspect, the invention involves a vehicle, e.g., a framed vehicle, comprising: two driven wheels; power means acting to provide power to rotate the driven wheels; at least one non-steered wheel or caster, preferably two of such non-steered wheels or casters; and seat means acting to provide a location at which a human being can sit and control the vehicle. The vehicle is sized so that the human being sitting in the seat means can directly control the steering of the coupled implement. The non-steered wheel or wheels not only provide support so that the vehicle can stand alone (when not coupled to an implement), but also are rotatable about an axis which itself is at least partially rotatable. Thus, the non-steered wheel or wheels, although not steered by a steering wheel, steering lever or the like associated with the vehicle, do swivel and do follow the coupled implement when the vehicle moves generally forward. Thus, when the vehicle is moving generally forward, the operator can control, e.g., point, the coupled implement in the desired direction and the vehicle follows the coupled implement in that direction. The coupled implement is preferably pivotably moveable relative to the frame and/or power means of the vehicle. In one particularly useful embodiment, the vehicle further comprises connecting means adapted to couple, e.g., pivotably couple, the implement to the vehicle, with the connecting means being pivotably moveable relative to the frame and/or power means of the vehicle.

The two driven wheels are preferably located at or near the rear end of the vehicle. These driven wheels are positioned to rotate in a direction generally parallel to the length of the vehicle. Each of the two driven wheels preferably includes an inner metallic portion and an outer solid polymeric portion which extends radially outwardly from and is directly secured to this inner metallic portion. This outer portion forms the contact surface between the driven wheel and the floor on which the vehicle is located. The metallic inner portion provides for strength and durability, while the polymeric outer portion provides for sufficient traction of the driven wheels and reduced wear on the floor on which the vehicle is located. In one particularly useful embodiment, the metallic inner portion is made of aluminum, which is lightweight yet strong, and the outer polymeric portion is polyurethane, in particular about 50 Durameter polyurethane, which is itself durable yet has a reduced tendency to mark or otherwise disfigure floors, in particular wooden floors.

One important preferred feature of the present invention is a power means which includes a non-gasoline powered motor, in particular an electric motor, directly coupled to a hydraulic transmission system. Using a non-gasoline powered motor reduces vehicle noise and the hazards associated with indoors operation. The direct coupling feature reduces the number of moving parts and provides for increased reliability, reduced wear and reduced and/or easier maintenance. The use of a hydraulic transmission itself provides substantial benefits. For example, such a transmission is very responsive to control by the operator while transferring the required amount of power to propel the vehicle and coupled implement.

In one useful embodiment, the vehicle further comprises disengaging means which, when activated, preferably manually activated, disengages the driven wheels from the power means. A disengaging means is particularly useful where, as is preferred, the power means is adapted to lock the driven wheels (engaged to the power means) against rotation when the power means is inactive or off, or in a neutral position, i.e., so that the power means exerts no force to move the vehicle. Thus, the disengaging means can be activated so that the driven wheels can be rotated when the power means is inactive or off, or in a neutral position. This allows the vehicle to be transported from one location to another simply by being pushed, e.g., manually pushed. The use of a hydraulic transmission system facilitates the locking of the driven wheels against rotation when the power means is in a neutral position.

The present vehicle preferably includes a control means which is directly linked to the power means and is manually operable to control the forward and reverse rotation of the driven wheels, and thereby the forward and reverse movement of the vehicle. The control means preferably includes a foot pedal located to be moved by the operator of the vehicle which is linked directly to the power means, in particular to the hydraulic transmission. This foot pedal can be moved so that the driven wheels rotate in the forward direction, in the rearward direction or do not rotate at all. Moreover, the foot pedal can be used to increase or decrease the speed of the vehicle, as desired. The foot pedal is directly linked to the power means, i.e., without the use of pulleys, belts, chains and sprockets, to reduce the number of moving parts and to increase the reliability of the control means.

In a particularly useful embodiment, the control means includes a self centering mechanism adapted to place the power means in a neutral position when no external force, e.g., foot pressure from the operator on the front pedal, is applied to the control means. For example, the control means may include two counterbalancing springs which are positioned so that the power means returns to its neutral position when no external force is applied to the control means.

The seat means is preferably adjustable to accommodate the specific human operator using the vehicle. The seat means is preferably coupled with a hydraulic device, e.g., a conventional hydraulic cylinder, to provide such adjustability. This hydraulic device is preferably separate and apart from the power means.

These and other aspects and advantages of the present invention are set forth in the following detailed description and claims, particularly when considered in conjunction with the accompanying drawings in which like parts bear like reference numerals.

BRIEF DESCRIPTION OF THE DRAWINGS

FIG. 1 is a schematic side plan view of one embodiment of the vehicle of the present invention with certain components of the control linkage assembly and the seat assembly shown in shadow lines.

FIG. 2 is a front plan view of the embodiment shown in FIG. 1.

FIG. 3 is a schematic cross-sectional view taken generally along line 3—3 of FIG. 1.

FIG. 4 is a side elevation view, partly in cross-section, showing the assembly of one of the driven wheels of the embodiment shown in FIG. 1.

FIG. 5 is a cross-sectional view taken generally along line 5—5 of FIG. 4.

FIG. 6 is a partial perspective view showing the vehicle of the present invention connected to two sanders.

DETAILED DESCRIPTION OF THE DRAWINGS

Referring now to the drawings, a riding trailer or vehicle, shown generally at 10, includes a frame 12, an AC electric motor 14, a hydraulic transmission 16, a rear end gear box 18, an axle 20, two driven wheels 22 and 24, and a seat 26. Vehicle 10 includes no independent steering system and, other than as described elsewhere herein, no independent braking system.

The frame 12 is made of a lightweight but sturdy material, such as aluminum, and provides a compartment 27 in which many of the other components, such as motor 14, hydraulic transmission 16 and rear end gear box 18, are housed. Frame 12 is closed at the bottom so as to minimize the risk of debris falling from compartment 27, e.g., onto the floor being sanded. The front of frame 12 includes a series of vent holes 28 which allow cooling air to pass into compartment 27. Of course, frame 12 can be opened to gain access to the components in compartment 27, e.g., for infrequent maintenance. In addition, frame 12 is configured to provide an open space 29 directly under seat 26. This open space 29 provides a convenient place for the operator of vehicle 10 to store tools which may be needed while operating vehicle 10.

Motor 14 is a conventional AC electric motor and is run on line voltage of about 220 volts AC supplied through AC receptacle 30. An electric cord 32 passes into a cord holder 34, which is affixed to the rear end of vehicle 10, along frame 12 and is fitted into sander receptacle 33. A cord extension 35 is provided from sander receptacle 33 which provides power to motor 14 through AC receptacle 30. Vehicle 10 is run on line voltage, not on batteries. An on/off switch 38, located on frame 12 below seat 26, is connected to motor 14 and allows the vehicle operator to control the on-off status of motor 14 simply by positioning on/off switch 38 appropriately. Cord holder 34 is adapted and acts to keep electric cord 32 off the floor near vehicle 10 so that it is not run over by vehicle 10. Also at the rear end of vehicle 10 is a rubber bumper 37 which reduces the impact in the event vehicle 10 collides with an object at its rear end.

The shaft 40 of motor 14 is directly coupled to hydraulic transmission 16 using coupling 42. A cooling fan 44 is situated so as to rotate with shaft 40 and provide a flow of air to cool hydraulic transmission 16.

Hydraulic transmission 16 is of unitary construction and includes various hydraulic components, e.g., a hydraulic motor, a pump, hydraulic fluid filled lines, etc. Hydraulic transmission 16 converts the uni-directional rotation of the shaft 40 into either forward or reverse rotation of output shaft 46 which is then transferred to axle 20 through rear end gear box 18, which is directly coupled to output shaft 46 of hydraulic transmission 16. One particularly useful sub-system for use as hydraulic transmission 16 is a hydraulic transmission sold by Eaton Fluid Power Products under the trademark LIGHT DUTY EATON HYDROSTATIC TRANSMISSION.

The direction and speed at which output shaft 46 of hydraulic transmission 16 rotates is controlled by the position of lever arm 48. Output shaft 46 is directly coupled to drive shaft 50 which is linked through rear end gear box 18 to axle 20. Thus, the direction and speed at which output shaft 46 rotates determines the direction and speed at which wheels 22 and 24 rotate.

The position of lever arm 48 is controlled as follows. Lever arm 48 is secured to one end of first linkage rod 52 the other end of which is secured to rotatable disc 54. A second linkage rod 56 is also secured at one end to rotatable disc 54 and is secured to foot pedal 58 at its other end. First and second linkage rods 52 and 56 are secured at different points to rotatable disc 54 away from the axis of rotation, preferably substantially equidistant away from the axis of rotation, of rotatable disc 54. Foot pedal 58 includes a forward wing 60 and a rearward wing 62. The linkage assembly described in this paragraph is structured so that as forward wing 60 is moved downwardly, driven wheels 22 and 24 rotate to move vehicle 10 in a generally forward direction. The further forward wing 60 is moved downwardly, the faster the vehicle 10 moves in the generally forwardly direction. This linkage is also structured so that as rearward wing 12 is moved downwardly, driven wheels 22 and 24 rotate to move vehicle 10 in a generally backward direction. The further rearward wing 62 is moved downwardly the faster the vehicle 10 moves in the generally backward direction. When no external force, e.g., manual force, is applied to foot pedal 58 and it is in a neutral position, lever arm 48 is also in a neutral position. In this neutral position, hydraulic transmission 16 exerts counterbalancing forces which, in effect lock output shaft 46 and ultimately driven wheels 22 and 24 against rotation. Thus, when foot pedal 58 is in the neutral position, driven wheels 22 and 24 are locked against rotation, and vehicle 10 is not free to move.

Rotatable disc 54 is secured, and rotatable relative, to stationary disc 64 which, in turn, is secured to frame 12. An important safety feature of the present invention is what can be termed a "self-centering mechanism" which causes the lever arm 48 to return and/or remain in the neutral or locked position in the absence of any external force applied to front pedal 58. This "self-centering mechanism" includes a first spring element 66 secured at one end to rotatable disc 54 and at the other end to a first outwardly extending peg 68 secured to stationary disc 64. Also included is a second spring element 70 secured at one end to rotatable disc 54 and at the other end to a second outwardly extending peg 72 secured to stationary disc 64. First and second spring elements 66 and 70 are structured and positioned to urge rotatable disc 54 to return and remain in such a position that lever arm 48 is in the neutral or locked position. Thus, for example, in order to move forward wing 60 (or rearward wing 62) of foot pedal 58 downwardly, the human operator must exert sufficient force to overcome second spring element 70 (or first spring element 66) which resists this movement. After the external force from the operator on foot pedal 58 is released, the force from second spring element 70 (or first spring element 66) moves the assembly, including lever arm 48, back into the neutral or locked position.

The rear end gear box 18 is geared at a ratio of 1 to 20 between the drive shaft 50 and the axle 20. Vehicle 10 includes direct couplings between motor 14, hydraulic transmission 16 and rear end gear box 18, rather than the belts, pulleys, chains and sprockets of certain prior art devices.

Driven wheels 22 and 24 each include an aluminum inner portion, such as shown at 74 with respect to wheel 22, which comprises the major amount of the radial thickness (diameter) of each of such driven wheels. Also included, on the radial outer surfaces of driven wheels 22 and 24, are solid polyurethane elements or coatings 76 and 78, respectively, which are made of about 50 Durameter polyurethane. The aluminum inner portion provides a sturdy, yet relatively lightweight wheel base, while the polyurethane element or coating provides a contact surface which has sufficient contact gripping or traction and reduces the chances of deleteriously marking or otherwise disfiguring the floor being sanded by the sander 36.

Because axle 20 is normally in a locked position, as discussed above, it is advantageous to disengage driven wheels 22 and 24 from axle 20 so that, for example, vehicle 10 can be rolled into place on the floor at the start of the sanding operation. FIGS. 4 and 5 illustrate one assembly for this disengagement. The following description is made with reference to driven wheel 22. However, it is to be understood that an analogous description with reference to driven wheel 24 also applies. In other words both driven wheels 22 and 24 are engaged and disengaged from axle 20 using analogous assemblies. Inner portion 74 of driven wheel 22 includes a centrally located through hole 80 extending radially outwardly around its axis of rotation. A ball bearing/spacer assembly 82 is fitted into this hole 80 and is secured in place using internal snap ring 84 which is fitted into groove 86 in inner portion 74. A hub, shown generally at 90, includes a rear portion 92 and a forward portion 94. Hub 90 includes a centrally located through hole 96 which is of varying diameter. Spring element 98 is placed inside the intermediate sized portion of the hole 96, and an elongated member 100 is passed through spring element 98 and threadably engaged to locking plate 102. Axle 20 is placed into hole 96 and secured to hub 90 by means of key 104 and set screws 106 and 108. In this manner, hub 90 rotates with axle 20, or is locked in place when axle 20 is locked in place.

The forward portion 94 includes a circular groove on its outside surface in which is fitted an exterior snapping ring 110. The forward end of forward portion 94 includes four grooves 112 each of which is disposed perpendicular to the next adjacent groove 112. Locking plate 102 includes four ribs 116 each of which is disposed perpendicular to the next adjacent rib 116.

The forward face of aluminum inner portion 74 includes four grooves 118 each of which is disposed perpendicular to the next adjacent groove 118. With each of the grooves 112 aligned with a different one of the grooves 118, each of the ribs 116 can be placed into a different one of these combined grooves 112/118. The action of spring element 98 keeps the ribs 116 in these combined grooves 112/118. In this manner, axle 20, hub 90 and driven wheel 22 are linked together so as to rotate together or be locked together. When axle 20 is locked in place (against rotation) so too is engaged driven wheel 22. To disengage driven wheel 22 from axle 20, locking plate 102 is pulled away from driven wheel 22 (pulled to the left with respect to wheel 22 in FIG. 4) to compress spring element 98 and remove ribs 116 from the combined grooves 112/118. Locking plate 102 is then rotated 45° and released. Driven wheel 22 is now free to rotate independently of axle 20. When it is desired to reengage driven wheel 22 to axle 20, driven wheel 22 is rotated until each of the grooves 118 line up with a different one of the grooves 112. Locking plate 102 is then rotated so that each of the ribs 116 fit into a different one of the combined grooves 112/118.

This driven wheel/axle engaging/disengaging assembly is easy to operate. Since there are four positions at which the driven wheel and axle can be engaged, the system can be operated rapidly. Also, the positive action of spring element 98 assures positive engagement of the axle and driven wheel when such engagement is desired.

Seat 26 is secured to hydraulic cylinder 120 which is operable to adjust the position of seat 26 vis-a-vis frame 12. The hydraulic cylinder 120 is independent of hydraulic transmission 16. Seat 26 provides a location at which the human operator can sit while operating vehicle 10. Lever 121 is manually adjustable to move seat 26 forward (toward the front of frame 12) or backward, as desired. First control knob 123 can be manually adjusted to raise or lower seat 26, as desired. Second control knob 125 can be manually adjusted to compensate for the weight of the human operator of vehicle 10.

Two non-steered casters 122 and 124 are located toward the front end of vehicle 10. These casters 122 and 124 rotate about an axis of rotation and are also capable of swiveling. That is, casters 122 and 124 are mounted on caster mounts 126 and 128, respectively, which rotate about an axis which is perpendicular to the axis of rotation of the casters. Thus, the axis of rotation of each of the casters is itself rotatable.

For durability and to reduce damaging wear, steel bushings 130 are secured to frame 12. These bushings 130 are adapted so that the stems of caster mounts 126 and 128 can be secured in place, using nuts 132 and 134, respectively. In this manner casters 122 and 124 are secured to frame 12. Because casters 122 and 124 swivel, they follow the direction of the sander 36 when vehicle 10 is moving generally forward. Thus, although casters 122 and 124 are not directly steered by the operator of vehicle 10, the operator, by changing the direction in which the sander 36 is pointed or moves, can influence the direction in which vehicle 10 moves. If desired, only one non-steered caster can be employed. In this embodiment, the single non-steered caster is preferably secured to frame 12 through the hole in frame 12 between casters 122 and 124 (FIG. 2) using a bushing and nut in a manner directly analogous to the manner in which casters 122 and 124 are secured to frame 12.

Two connecting rods 136 and 138 are secured to and pivotably moveable relative to frame 12. These connecting rods 136 and 138 are pivotably secured to frame 12 using hook-up pins 140 and 142, respectively. Connecting rods 136 and 138 are also secured to the sander 36. Alternately, the connecting rods 136 and 138 can be joined to a cross bar 150 which includes a plurality of pairs of elongated connectors 152 and 154. Each of these elongated connectors 152 and 154 is rigidly affixed to the cross bar 150 and extends in substantially the same direction relative to the length of the cross bar. The pairs of elongated connectors 152 and 154 are coupled to separate sanders 156 and 158, respectively. If desired, cross bar 150 can be made longer and more pairs of elongated connectors affixed thereto so that more than two sanders can be coupled to cross bar 150. In this embodiment, vehicle 10 may be used to simultaneously control a plurality of sanders.

Using vehicle 10 to control the sander 36 allows for effective sanding of large areas of flooring and other surfaces. The vehicle 10 reduces the time required to do this job. In addition, vehicle 10 is easy to operate, and is of relatively simple and straight forward construction. The components of vehicle 10 are subject to reduced wear, e.g., relative to prior art systems involving belts, pulleys, chains and sprockets. Vehicle 10 is very maneuverable, is not noisy, allows for variable speeds and is designed to have little or no adverse impact on the floor or surface being sanded or otherwise finished.

While this invention has been described with respect to various specific examples and embodiments, it is to be understood that the invention is not limited thereto and that it can be variously practiced within the scope of the following claims.

What is claimed is:

1. A vehicle having a length, a front end and a substantially opposing rear end useful in controlling an implement coupled thereto, said vehicle comprising:
   two driven wheels located near said rear end and positioned to rotate in a direction generally parallel to said length of said vehicle;
   power means for providing power to rotate said two driven wheels;
   at least one non-steered wheel located near said front end, said non-steered wheel being rotatable about an axis which axis is at least partially rotatable;
   seat means for providing a location at which a human being can sit on said vehicle and control said vehicle; and
   said vehicle having no independent steering system and being sized so that the human being sitting in said seat means is capable of directly steering said coupled implement.

2. The vehicle of claim 1 which includes two of said non-steered wheels.

3. The vehicle of claim 1 wherein each of said two driven wheels includes an inner metallic portion and an outer solid polymeric portion directly secured to said inner metallic portion.

4. The vehicle of claim 3 wherein said inner metallic portion is made of aluminum and said outer solid polymeric portion is made of polyurethane.

5. The vehicle of claim 1 wherein said power means includes a non-gasoline powered motor directly coupled to a hydraulic transmission system.

6. The vehicle of claim 5 wherein said non-gasoline powered motor is an electric motor.

7. The vehicle of claim 6 which further comprises an electrical receptacle means through which line voltage of about 100 volts or more is passed to power said electric motor.

8. The vehicle of claim 1 which further comprises disengaging means for disengaging one of said driven wheels from said power means.

9. The vehicle of claim 8 wherein said disengaging means includes a spring element positioned to exert a force resisting the disengagement of said driven wheel from said power means.

10. The vehicle of claim 9 wherein said disengaging means further includes a locking plate adapted to be manually moved to overcome the force of said spring element and disengage said driven wheel from said power means.

11. The vehicle of claim 10 wherein said locking plate and said driven wheel are adapted to be coupled together at any one of a plurality of positions when said driven wheel is engaged to said power means.

12. The vehicle of claim 5 which further comprises control means directly linked to said hydraulic transmission system and being manually operable to control the forward and reverse rotation of said driven wheels.

13. The vehicle of claim 12 wherein said control means is further manually operable to control the speed of rotation of said driven wheels.

14. The vehicle of claim 13 wherein said control means further includes a centering means for placing said power means in a neutral position when no external force is applied to said control means.

15. The vehicle of claim 14 wherein said centering means includes a plurality of spring elements.

16. The vehicle of claim 1 which further comprises an electrical cord holder means for holding an electrical cord.

17. The vehicle of claim 1 which further comprises connecting means for coupling the implement to said vehicle.

18. The vehicle of claim 1 which further comprises frame means defining a space in which said power means is located.

19. The vehicle of claim 6 wherein said electric motor is coupled to said hydraulic transmission system and said hydraulic transmission system is linked to said driven wheels using coupling and linking mechanisms including no belts, pulleys, chains or sprockets.

20. A vehicle having a length, a front end and a substantially opposing rear end useful in controlling an implement pivotably coupled thereto, said vehicle comprising:

two driven wheels located near said rear end and positioned to rotate in a direction generally parallel to said length of said vehicle;

power means including an electrically powered motor directly coupled to a hydraulic transmission system for providing power to rotate said two driven wheels;

at least one non-steered wheel located near said front end, said non-steered wheel being rotatable about an axis which axis is at least partially rotatable;

seat means for providing a location at which a human being can sit on said vehicle and control said vehicle; and said vehicle having no independent steering system and being sized so that the human being sitting in said seat means is capable of directly steering said pivotably coupled implement.

* * * * *